(12) United States Patent
Winkelmann

(10) Patent No.: US 11,297,475 B2
(45) Date of Patent: Apr. 5, 2022

(54) DEVICE FOR TRANSMITTING DATA WITHIN A VEHICLE

(71) Applicant: TE Connectivity Germany GmbH, Bensheim (DE)

(72) Inventor: Andreas Winkelmann, Sindelfingen (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 16/225,467

(22) Filed: Dec. 19, 2018

(65) Prior Publication Data
US 2019/0200192 A1 Jun. 27, 2019

(30) Foreign Application Priority Data
Dec. 22, 2017 (DE) .......................... 102017131138.6

(51) Int. Cl.
| | | |
|---|---|---|
| H04W 4/48 | (2018.01) | |
| H04W 88/08 | (2009.01) | |
| H04L 27/16 | (2006.01) | |
| H04L 29/06 | (2006.01) | |
| H01Q 1/32 | (2006.01) | |
| H04L 69/08 | (2022.01) | |
| H04L 69/18 | (2022.01) | |
| H04L 67/12 | (2022.01) | |

(52) U.S. Cl.
CPC ................ *H04W 4/48* (2018.02); *H01Q 1/32* (2013.01); *H04L 27/16* (2013.01); *H04L 67/12* (2013.01); *H04L 69/08* (2013.01); *H04L 69/18* (2013.01); *H04W 88/085* (2013.01)

(58) Field of Classification Search
CPC ...... H04W 4/48; H04W 88/085; H04L 27/16; H04L 69/08
See application file for complete search history.

(56) References Cited

U.S. PATENT DOCUMENTS

| | | | | |
|---|---|---|---|---|
| 5,333,176 A | * | 7/1994 | Burke ............... | H04M 1/72409 455/557 |
| 5,825,286 A | * | 10/1998 | Coulthard ............ | B60C 23/009 340/447 |
| 2007/0015485 A1 | * | 1/2007 | DeBiasio ............... | H04B 1/082 455/345 |
| 2008/0139156 A1 | * | 6/2008 | Behzad ................ | H04B 1/0067 455/296 |
| 2008/0205417 A1 | * | 8/2008 | Li ........................... | H04L 69/08 370/401 |
| 2010/0310008 A1 | * | 12/2010 | Aoki ..................... | H04L 5/0007 375/300 |
| 2013/0101066 A1 | * | 4/2013 | Dick .................... | H04L 27/368 375/296 |

(Continued)

OTHER PUBLICATIONS

German Patent Office Communication, App. No. 102017131138.6, dated Oct. 22, 2018, 10 pages.

*Primary Examiner* — Rasheed Gidado
(74) *Attorney, Agent, or Firm* — Barley Snyder

(57) ABSTRACT

A device for transmitting data within a vehicle comprises a first connecting element and a cable transmission element. The first connecting element is connected to an antenna and translates a high-frequency data received by the antenna into a digital data. The cable transmission element is connected to the first connecting element and transmits the digital data.

16 Claims, 5 Drawing Sheets

(56) References Cited

U.S. PATENT DOCUMENTS

| | | | |
|---|---|---|---|
| 2013/0324181 A1* | 12/2013 | Aio | H04W 52/04 |
| | | | 455/522 |
| 2014/0163979 A1* | 6/2014 | Suzuki | G10L 21/04 |
| | | | 704/233 |
| 2014/0185694 A1* | 7/2014 | Akahori | H04B 1/1009 |
| | | | 375/257 |
| 2015/0003550 A1* | 1/2015 | Koppelaar | H04W 88/085 |
| | | | 375/267 |
| 2017/0079059 A1 | 3/2017 | Li et al. | |
| 2018/0269915 A1* | 9/2018 | Spehl | H04B 1/0032 |
| 2018/0331746 A1* | 11/2018 | Okuyama | H04W 72/0426 |
| 2019/0113601 A1* | 4/2019 | Trotta | H01L 23/66 |
| 2019/0140684 A1* | 5/2019 | Spehl | H04B 1/0007 |
| 2019/0273567 A1* | 9/2019 | Kim | H03M 1/66 |

\* cited by examiner

DEVICE FOR TRANSMITTING DATA WITHIN A VEHICLE

CROSS-REFERENCE TO RELATED APPLICATIONS

This application claims the benefit of the filing date under 35 U.S.C. § 119(a)-(d) of German Patent Application No. 102017131138.6, filed on Dec. 22, 2017.

FIELD OF THE INVENTION

The present invention relates to a device for transmitting data and, more particularly, to a device for transmitting data within a vehicle.

BACKGROUND

Mobile communication in the automobile field is increasingly multifaceted and costly. Different protocols are used, which create different radio communication standards or communication technologies within the vehicle, for example, in the form of mobile communications 3G/4G/5G, Car-to-Car communication, Car-to-X communication, Bluetooth, WiFi, WLAN, etc., which can be created via respectively allocated antennas. In particular, the 5G connectivity, which will soon be used, requires at least four to eight additional antennae at various positions within the vehicle. A suitable cabling of the antennae is required by coaxial cables with, where necessary, additional intermediate amplifiers. However, despite the increasing electronics, the space allocated for this within the vehicle is limited.

A chipset AD 9361 from Analog Devices® has an HF 2×2 transceiver with integrated 12-bit D/A and A/D converters. The chipset operates in the frequency range from 70 MHz to 6 GHz and combines an HF frontend with a flexible mixed-signal baseband section and integrated frequency synthesizers, and provides a configurable digital interface to a microprocessor. The chipset AD 9361 is suitable for point-to-point communication systems, femto-, pico- and micro-base stations, and general radio communication systems.

In mobile communications base stations, the baseband chip and frontend elements are arranged separated from one another and are connected by a fibre-optic conductor, via which digital data are transported. The functionalities of the processing of the data in the baseband and transmission of the data via the antenna are thus carried out with separate elements.

SUMMARY

A device for transmitting data within a vehicle comprises a first connecting element and a cable transmission element. The first connecting element is connected to an antenna and translates a high-frequency data received by the antenna into a digital data. The cable transmission element is connected to the first connecting element and transmits the digital data

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
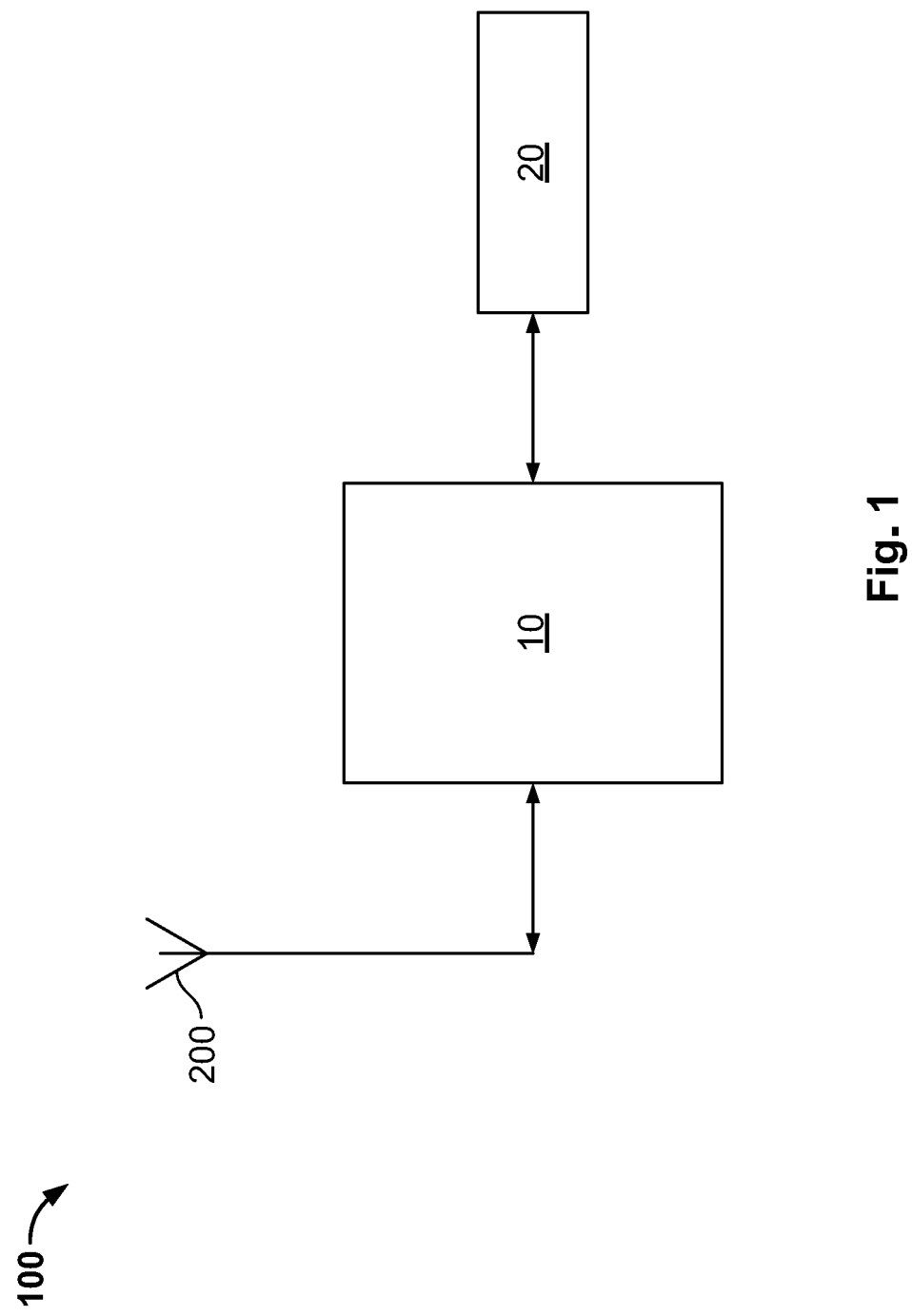
FIG. 1 is a block diagram of a device for transmitting data according to an embodiment.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will convey the concept of the invention to those skilled in the art.

A device 100 according to an embodiment for transmitting data within a vehicle is shown in FIG. 1. The vehicle (not shown) may be any of a wide variety of motor vehicles, such as a land vehicle, a water vehicle, or an air vehicle. The device 100 comprises a first connecting element 10, a cable transmission element 20, and an antenna 200.

The first connecting element 10, shown in FIG. 1, is a high-frequency (HF) frontend module and/or a discrete circuit and is linked to the antenna 200. The antenna 200 can be configured here as an antenna for a wide variety of communication purposes in the vehicle, for example as a mobile communications antenna for 3G/4G/5G, a Bluetooth antenna, a WiFi antenna, a Car-to-X antenna, a Car-to-Car-antenna, or other types of antennas known to those with ordinary skill in the art.

Analogue HF data received by the antenna 200 are converted into digital data by the first connecting element 10, such as by performing a mixing, filtering, amplification and provision of IQ data, for example, over two separate paths. These principles of frontend element conversion into digital data are known and will not be explained in greater detail herein.

After the conversion of the data is carried out at the first connecting element 10, the digital data are transmitted to a cable transmission element 20 shown in FIG. 1, which provides the data for further use within the vehicle at an output of the cable transmission element 20. The cable transmission element 20 can be configured as, for example, a two-wire line, four-wire line, fibre-optic lines, dielectric lines, or any other lines that can be laid simply within the vehicle and which have favorable transfer properties, such as a low damping, for example. The cable transmission element 20 is an easy-to-lay "digital cable" used for the data communication within the vehicle. In addition to being easier to lay within the vehicle than a coaxial cable, the cable transmission element 20 also has lower losses.

The digital data are transferred via the cable transmission element 20 in accordance with the common public radio interface (CPRI) protocol, which is a protocol known in the field of mobile communications base stations, for the transfer of IQ data between baseband element and frontend element, for which several manufacturers supply products. In other embodiments, a transfer of the digital data via the cable transmission element 20 in accordance with other transfer protocols is also conceivable.

The device 100 thereby converts the high-frequency data received by the antenna 200 into digital data, with the digital data being efficiently provided and distributed within the vehicle. In this manner, controlling lines are created via the cable transmission element 20 for the various antennae 200 specified above, via which the digital data can be transferred in accordance with various data communication protocols. As a result, it is thereby possible to use, in the device 100, cost-effective consumer chipsets which can create a plurality of functionalities for the data communication as described herein. Better applicability of antennae 200 configured in accordance with different technologies is thereby supported in the vehicle. Furthermore, additional compensation or intermediate amplifiers are not required with the cable transmission element 20, which advantageously saves on construction space within the vehicle.

Figure 2:
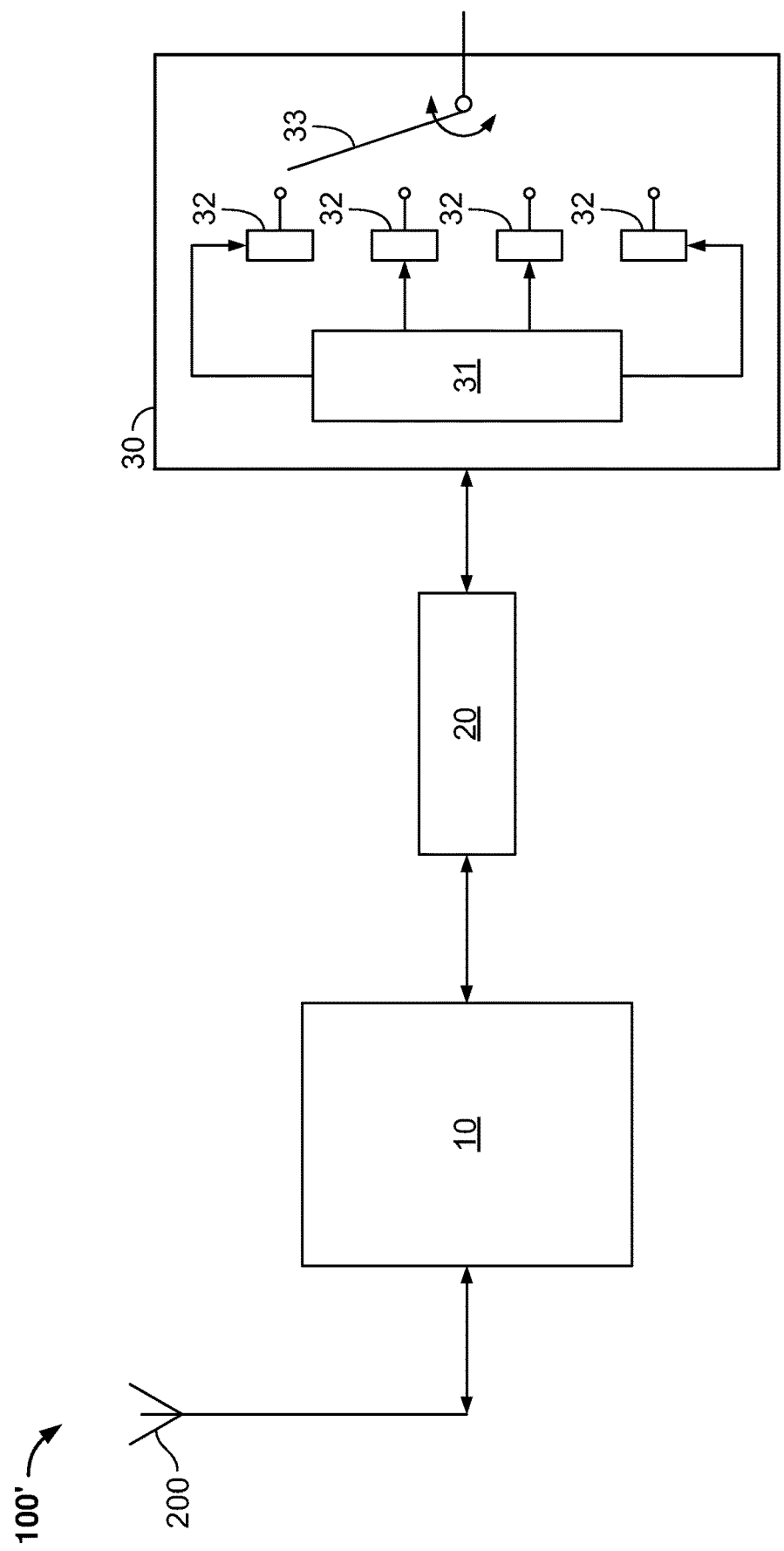
FIG. 2 is a block diagram of a device for transmitting data according to another embodiment.

A device 100' according to another embodiment for transmitting data within the vehicle is shown in FIG. 2. Like reference numbers refer to like elements, and only the differences from the embodiment shown in FIG. 1 will be described in greater detail herein.

The device 100', as shown in FIG. 2, includes a baseband element 30 linked to the cable transmission element 20. The baseband element 30 includes a transformation element 31, which performs a Fast Fourier Transform (FFT) of the digital data supplied via the cable transmission element 20. The data obtained from the FFT, having very many different carrier frequencies, are supplied to demodulation elements 32 which demodulate the digital data. The demodulated digital data is combined with the aid of a switch apparatus 33 to form the actual digital data streams or digital data words which correspond to the HF data received by the antenna 200.

As shown in FIG. 2, the first connecting element 10 and the baseband element 30 can be spatially separate from one another in the vehicle and an easily layable cable transmission element 20 is connected between them. With the device 100', for example, an infotainment module, a smart antenna, etc., can be linked to the baseband element 30 in the vehicle and be provided with digital data by the baseband element.

Figure 3:
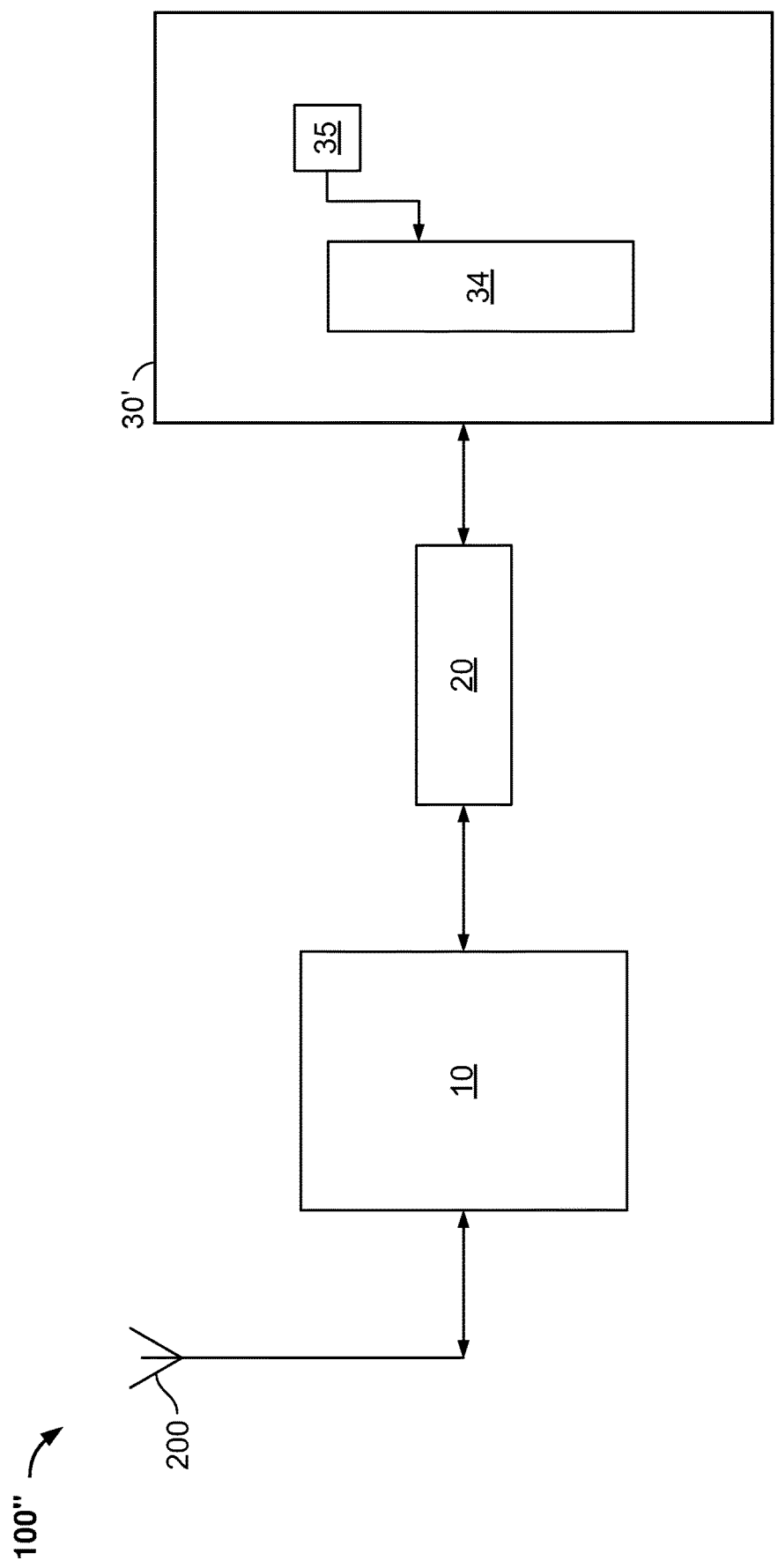
FIG. 3 is a block diagram of a device for transmitting data according to another embodiment.

A device 100'' according to another embodiment for transmitting data within a vehicle is shown in FIG. 3. Like reference numbers refer to like elements, and only the differences from the embodiment shown in FIG. 2 will be described in greater detail herein. The device 100'' includes a baseband element 30' according to another embodiment, the baseband element 30' has a programmable electronic component 34, such as a controller or a processor, linked to the cable transmission element 20. The programmable electronic component 34 is executable with data from an electronic memory element 35. The electronic memory element 35 is a non-transitory computer readable medium, such as a flash memory.

In the device 100'', a plurality of different software stacks, respectively allocated to different transfer protocols, are written or loaded into the programmable electronic component 34. As a result, the baseband element 30' is able to operate different transfer standards with respectively allocated communication protocols. In this manner, it is possible, for example, depending on the specific application, for the baseband element 30' to assume various functionalities and as a result can also be used to control different antennae 200 that are operated in accordance with different communication protocols. It is, for example, possible for an antenna 200 only seldom used in the vehicle, such as a Bluetooth antenna for carrying out an autonomous parking maneuver of the vehicle, to be used in other scenarios to transmit WiFi-data, for example. This is possible through the transfer of the software stored on the memory element 35 into the programmable module 34. In this way, a type of "Software Defined Radio" can be created in a simple and convenient manner, because the diverse different radio communications standards often are not used at the same time or in parallel.

Figure 4:
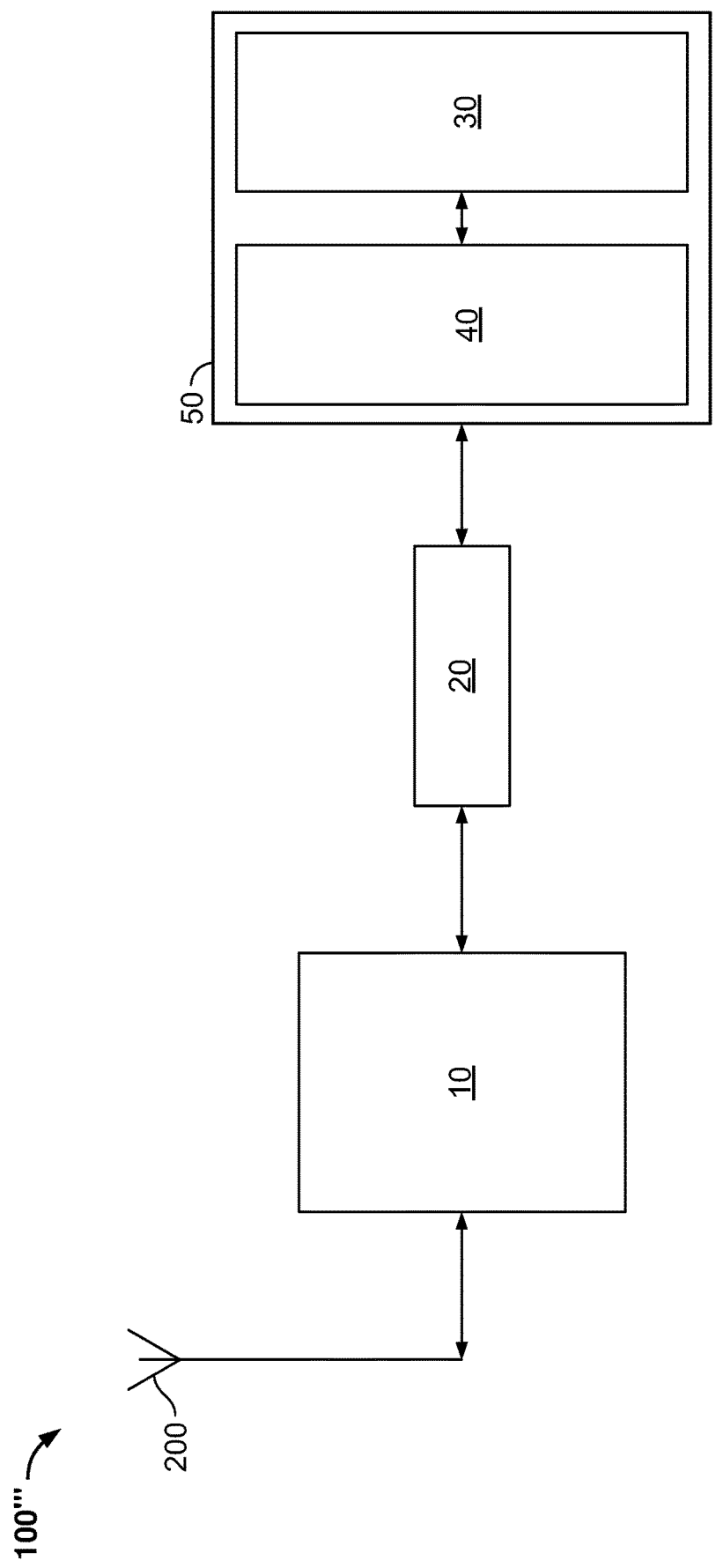
FIG. 4 is a block diagram of a device for transmitting data according to another embodiment.

A device 100''' according to another embodiment for transmitting data within a vehicle is shown in FIG. 4. Like reference numbers refer to like elements, and only the differences from the embodiments shown in FIGS. 1-3 will be described in greater detail herein. In the device 100''', a second connecting element 40, which is spatially closely connected to the baseband element 30, is linked to the cable transmission element 20. The second connecting element 40 is capable of translating the digital data into HF data. The baseband element 30 and the second connecting element 40 form a combination element 50 advantageously available as a cost-effective electronic module from the consumer and/or automobile field.

In the embodiments of the device 100, 100', 100'', 100''' described above, it is possible to link a telematics module to an output of the cable transmission element 20 using a standard chipset from the consumer field. As a result, it is possible for an easily implementable transfer of digital data, which has been provided from analogue HF received data, to be implemented within a vehicle. The device 100, 100', 100'', 100''' can be advantageously used to connect different HF systems to one another, with a wide variety of wireless standards, for example, broadcast FM/DAB/TV, mobile communications according to 3G/4G/5G, WiFi with 2.4 and 5.9 GHz, V2X, etc., being used for the HF systems and being able to be flexibly adapted in a simple manner.

With the device 100, 100', 100'', 100''', it is possible to reduce as far as possible, or even entirely eliminate, the use of inflexible coaxial cables, which are sensitive to mechanical damage, within the vehicle. Use of the device 100, 100', 100'', 100''' is also conceivable in industrial applications, in which use of vulnerable coaxial cables is not sensible or appropriate. Advantageously, the device 100, 100', 100'', 100''' makes it possible to have an improved transfer of digital data within the vehicle, while at the same time laying out the hardware architecture flexibly and saving cost on electronic components.

Figure 5:
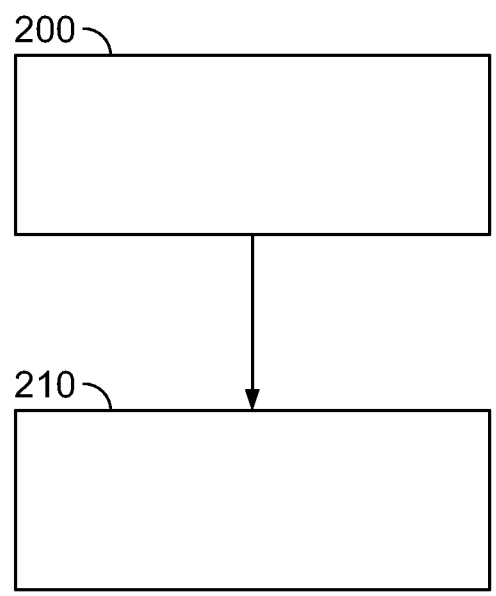
FIG. 5 is a flowchart of a method for transmitting data.

A method according to an embodiment is shown in FIG. 5. The method can be configured as software which runs on the device 100 and, as a result, can be altered and adapted in a simple manner with suitable programming. In a step 200, a translation of HF-data, received by the antenna 200, into digital data is carried out by the first connecting element 10 functionally connected to the antenna 200. In a step 210, a transmission of the digital data is carried out by the cable transmission element 20 functionally connected to the first connecting element 10.

What is claimed is:

1. A device for transmitting data within a vehicle, comprising:
   a first connecting element connected to an antenna and translating a high-frequency data received by the antenna into a digital data;
   a cable transmission element connected to the first connecting element and transmitting the digital data in a plurality of different carrier frequencies, the cable transmission element does not have an intermediate amplifier;
   a second connecting element connected to an output of the cable transmission element, the second connecting element is capable of translating the digital data into the high-frequency data; and
   a baseband element connected to the output of the cable transmission element, the baseband element receives the digital data in the plurality of different carrier frequencies and outputs the digital data in a plurality of digital data streams, the baseband element has a transformation element that performs a Fast Fourier Transform of the digital data.

2. The device of claim 1, wherein the baseband element has a programmable electronic component.

3. The device of claim 2, wherein a plurality of software stacks of various communication protocols are loaded into the programmable electronic component.

4. The device of claim 1, wherein the baseband element has a plurality of demodulation elements.

5. The device of claim 4, wherein the transformation element transforms the digital data received from the cable transmission element and supplies the transformed data to the demodulation elements.

6. The device of claim 5, wherein the demodulation elements demodulate the transformed data and the baseband element has a switch apparatus capable of assembling the demodulated data from the demodulation elements into the plurality of digital data streams.

7. The device of claim 1, wherein the cable transmission element is at least one of a two-wire line, a four-wire line, a fiber-optic line, and a dielectric line.

8. The device of claim 1, wherein the cable transmission element transmits the digital data in accordance with the common public radio interface (CPRI) protocol.

9. The device of claim 1, wherein the baseband element and the second connecting element form a combination element in which the second connecting element is spatially closely connected to the baseband element.

10. The device of claim 3, wherein the first connecting element includes a plurality of first connection elements connected to a respective plurality of antennas, each respective antenna and first connecting element defining a distinct high-frequency system utilizing a distinct wireless communication protocol, the cable transmission element connected to the first connecting elements of each of the high-frequency systems and transmitting the digital data received therefrom to the baseband element.

11. A method for transmitting data within a vehicle, comprising:
translating a high-frequency data received at an antenna into a digital data using a first connecting element connected to the antenna;
transmitting the digital data in a plurality of different carrier frequencies using a cable transmission element connected to the first connecting element, the cable transmission element does not have an intermediate amplifier;
translating the digital data received from the cable transmission element into the high-frequency data using a second connecting element connected to an output of the cable transmission element;
forming the digital data in the plurality of different carrier frequencies received from the cable transmission element into a plurality of digital data streams using a baseband element connected to the output of the cable transmission element; and
performing a Fast Fourier Transform of the digital data with a transformation element of the baseband element.

12. The method of claim 11, wherein the cable transmission element transmits the digital data in accordance with the common public radio interface (CPRI) protocol.

13. The method of claim 11, wherein a functionality of the baseband element is definable by a software stack loaded into a programmable electronic component of the baseband element, the software stack including a plurality of software stacks of various communication protocols loaded into the programmable electronic component.

14. The method of claim 13, wherein:
the step of translating a high-frequency data includes translating high frequency data received at a plurality of antennas into digital data using a corresponding plurality of first connecting elements, each respective antenna element and first connecting element defining a distinct high-frequency system utilizing a distinct wireless communication protocol; and
the step of transmitting the digital data includes transmitting the digital data received from each of the first connection elements with the cable transmission element in accordance with a common public radio interface protocol.

15. A computer program product stored on a non-transitory computer readable medium and, when executed on a device for transmitting data within a vehicle, performing the steps of:
translating a high-frequency data received at an antenna into a digital data using a first connecting element connected to the antenna;
transmitting the digital data in accordance with the common public radio interface (CPRI) protocol in a plurality of different carrier frequencies using a cable transmission element connected to the first connecting element, the cable transmission element does not have an intermediate amplifier;
translating the digital data received from the cable transmission element into the high-frequency data using a second connecting element connected to an output of the cable transmission element;
forming the digital data in the plurality of different carrier frequencies received from the cable transmission element into a plurality of digital data streams using a baseband element connected to the output of the cable transmission element; and
performing a Fast Fourier Transform of the digital data with a transformation element of the baseband element.

16. The computer program product of claim 15, wherein:
the step of translating a high-frequency data includes translating high frequency data received at a plurality of antennas into digital data using a corresponding plurality of first connecting elements, each respective antenna and first connecting element defining a distinct high-frequency system utilizing a distinct wireless communication protocol;
the step of transmitting the digital data includes transmitting the digital data received from each of the first connection elements with the cable transmission element in accordance with the CPRI protocol; and
the baseband element includes a programmable electronic component accessing a plurality of software stacks of various communication protocols for forming the digital data received from the cable transmission element into the plurality of digital data streams.

* * * * *